United States Patent [19]

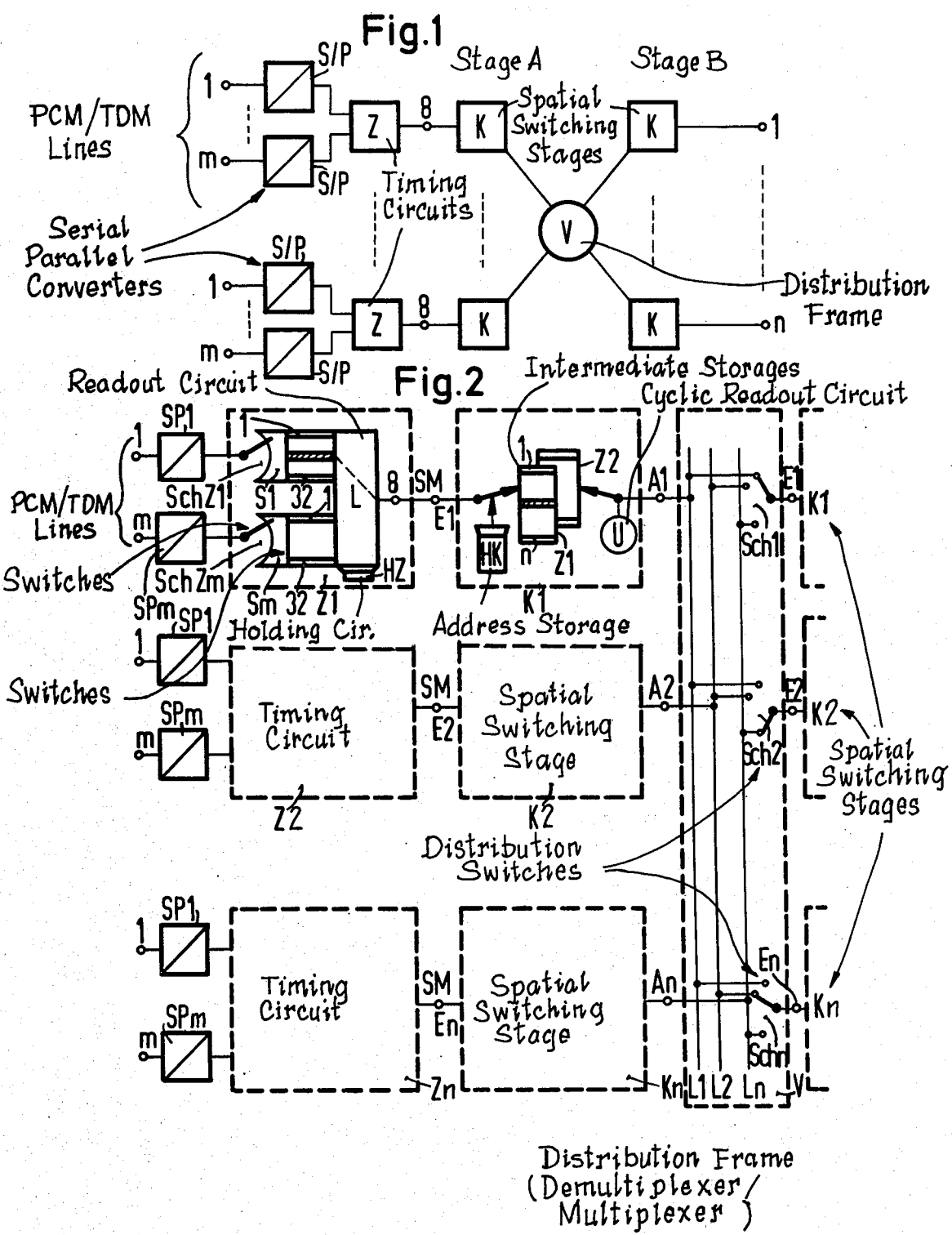

Schlichte

[11] 4,162,375
[45] Jul. 24, 1979

[54] TIME-DIVISON MULTIPLEX SWITCHING NETWORK WITH SPATIAL SWITCHING STAGES

[75] Inventor: Max Schlichte, Munich, Fed. Rep. of Germany

[73] Assignee: Siemens Aktiengesellschaft, Munich, Fed. Rep. of Germany

[21] Appl. No.: 870,750

[22] Filed: Jan. 19, 1978

Related U.S. Application Data

[63] Continuation of Ser. No. 729,717, Oct. 5, 1976, abandoned, which is a continuation of Ser. No. 644,865, Dec. 29, 1975, abandoned, which is a continuation of Ser. No. 552,809, Dec. 25, 1975, abandoned, which is a continuation of Ser. No. 343,238, Mar. 21, 1973, abandoned.

[30] Foreign Application Priority Data

Mar. 23, 1972 [DE] Fed. Rep. of Germany ....... 2214202

[51] Int. Cl.$^2$ ............................................. H04J 3/00
[52] U.S. Cl. ................................................ 179/15 AT
[58] Field of Search ...................... 179/15 AT, 15 AQ

[56] References Cited

U.S. PATENT DOCUMENTS

| | | | |
|---|---|---|---|
| 3,597,548 | 8/1971 | Drinnan et al. ................ | 179/15 AT |
| 3,639,693 | 2/1972 | Bartlett et al. ................ | 179/15 AT |
| 3,678,206 | 7/1972 | Dupieux et al. ............... | 179/18 J |
| 3,678,206 | 7/1972 | Dupieux et al. ............... | 179/18 J |
| 3,736,381 | 5/1973 | Johnson et al. ............... | 179/15 AQ |
| 3,743,789 | 7/1973 | Krupp ............................ | 179/15 BY |
| 3,790,713 | 2/1974 | Neufang ........................ | 179/15 AT |

*Primary Examiner*—Thomas W. Brown
*Attorney, Agent, or Firm*—Schuyler, Birch, Swindler, McKie & Beckett

[57] ABSTRACT

A TDM/PCM switching network comprising a plurality of time and spatial switching circuits associated with different groups of TDM lines. The present invention is primarily concerned with the manner in which these time and spatial switching circuits are arranged to transmit PCM words from a particular origin route to a given destination route. The spatial switching circuits each include intermediate storage means having a plurality of individual storage positions which are individually assigned to a predetermined destination route in the switching network. Time slots on the TDM lines are divided into a plurality of time intervals each associated with a particular TDM line of the group of TDM lines connected to the time circuit. Time slots are transmitted to the spatial switching circuit which includes a holding storage for allocating the PCM signal contained in the time intervals of a particular time slot to an intermediate storage according to the time slot or time channel itself. The PCM signals are connected to the appropriate destination TDM line through a demultiplexer/multiplexer device and other spatial switching circuits.

4 Claims, 3 Drawing Figures

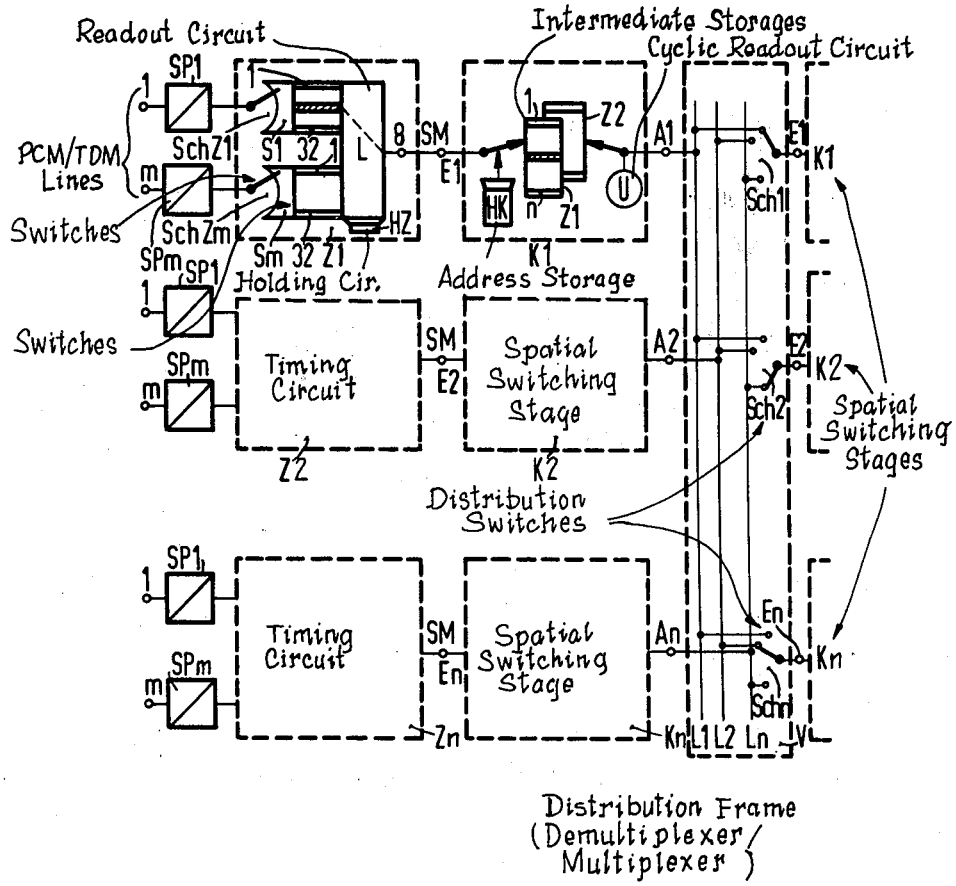

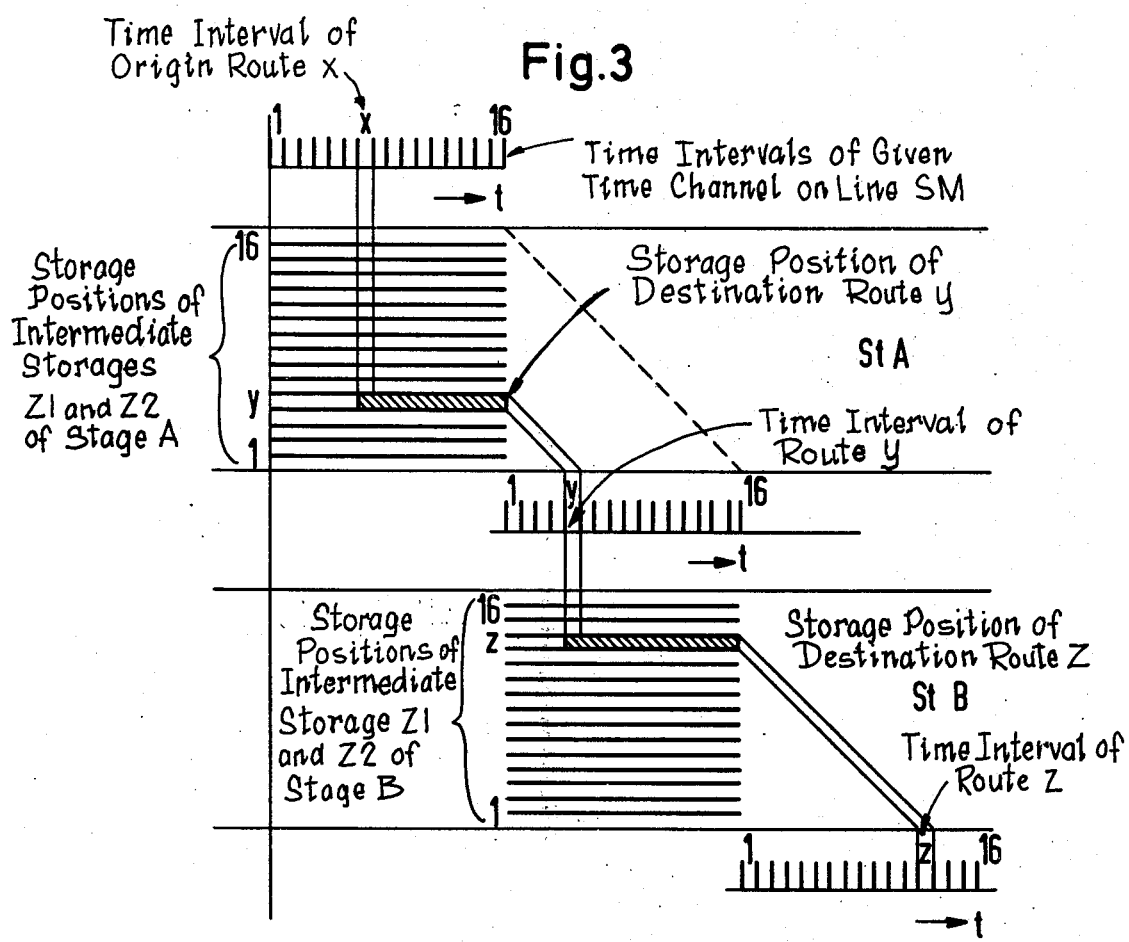

TIME-DIVISON MULTIPLEX SWITCHING NETWORK WITH SPATIAL SWITCHING STAGES

This is a continuation of Ser. No. 729,717, filed Oct. 5, 1976, now abandoned; which is a continuation of Ser. No. 644,865, filed Dec. 29, 1975, now abandoned; which is a continuation of Ser. No. 552,809, filed Dec. 25, 1975, now abandoned; which is a continuation of Ser. No. 343,238, filed Mar. 21, 1973, now abandoned.

BACKGROUND OF THE INVENTION

In conventional telecommunication switching systems, more particularly telephone switching systems, analog signal transmissions, which are continuous in time, occur in transmission channels physically or spatially separated from one another. Modern telephone switching systems have tended not to utilized the space division principle, but the time-division multiplex principle, according to which analog signals, which are discontinuous in time, are transmitted. Of particular importance are the telephone switching systems in which a transmission of digital signals (which are also discontinuous in time) takes place. In this connection, the pulse code modulation (PCM) is used wherein, at periodically consecutive instants, the instantaneous values of the amplitudes of the voice signal are characterized through binary words, which are subsequently transmitted.

A basic task of a PCM time-division multiplex central office lies in through-connecting the binary words occurring on the time-division multiplex lines of the PCM receiver leading to the central office in time channels which on these lines are allotted to the individual connections, to the desired connection in accordance with selected time-division multiplex lines of the PCM sender leading away from the central office. Thus, in the course of a time-division multiplex procedure a time channel conversion must be carried out from the time channel seized on the incoming time-division multiplex lines to the time channel to be seized on the outgoing time-division multiplex line. Further, a spatial through-connection must be effected from an incoming time-division multiplex line to the selected outgoing time-division multiplex line.

In accordance with the above tasks in time sharing technology, an essential part of the switching systems are switching networks comprising time circuits and spatial circuits. The timing circuits have intermediate storages in which the PCM signals are stored intermediately during the time interval between incoming and outgoing time channel. The spatial circuits comprise crosspoint switches operated periodically and by pulses, over which incoming time-division multiplex lines are capable of being connected with outgoing time-division multiplex lines. Depending on the functional sequence of the timing circuits and spatial circuits, several structures of switching networks are possible. The choice of circuit used depends on the conditions imposed on the switching system.

For example, the space-time-space system (S-T-S) comprises a spatial circuit at the input end, to which are connected the storages of the timing circuit, and the outputs of which are connected with the inputs of a second spatial circuit at the output end. This structure of the switching network has the characteristic that the centrally arranged intermediate storages of the timing circuit can be utilized repeatedly in time sharing, and it is particularly of advantage in synchronous telecommunications networks, since they need no storages at the input and output of the switching centers. A disadvantage of this switching network structure is the fact that the expansion possibility of switching centers so constructed cannot be carried out in small steps with economically justifiable expenditure, since a minimum number of storages must be committed in advance with the basic expansion. Compared thereto, switching networks with a time-space (T-S) structure are more advantageous. At the input end, they have timing circuits allocated to individual lines for the conversion from incoming time channels to outgoing time channels, to which are connected the switching networks having crosspoint contacts which are operated during the time channels to which conversion has taken place through the timing circuit. Switching networks, so constructed, can be expanded without difficulty and are of interest especially for asynchronous switching systems in which intermediate storages are at any rate needed at the input end for purposes of synchronization.

The transmission of PCM signals in the course of such switching can be accomplished either according to the serial bit method, i.e., the individual bits of the PCM signals are transmitted sequentially, or according to the bit parallel method, i.e., all the bits of a PCM signal are transmitted simultaneously. Parallel bit transmission requires either a serial to parallel or parallel to serial converter at the input and output end and, at least at the input end, a storage is required in which the PCM signals for the duration of a pulse frame can be stored intermediately. Furthermore, an increased expenditure for crosspoint switches is required in accordance with the number of bits per PCM signal. However, since in the case of parallel through-connection only a fraction of the through-connection time is required, as is required for series through-connection, the crosspoints and collecting mains disposed within the spatial switching network can be considerably better utilized so that the parallel through-connecting in comparatively large storage systems leads to great economy.

In a time-division multiplex switching network of known construction (West German Examined Application No. 1,762,270) using the T-S structure, and wherein the transmission of the PCM signal takes place according to the parallel bit method, the expansion possibilities mentioned hereinabove, which are virtually unlimited by the system, are, likewise, provided in principle. Even if this type of time-division multiplex switching networks can readily be adapted to the particular telephone traffic to be controlled through corresponding expansions, certain limits remain, because very large spatial switching networks no longer offer an economically acceptable solution, due to the wiring difficulty of them.

It is an object of the invention to provide a time-division multiplex switching network using the T-S structure, wherein expansions are readily feasible and wherein, even if very large switching networks arise as a result, the amount of apparatus required, particularly for the spatial switching network therein, is held within reasonable bounds.

SUMMARY OF THE INVENTION

The aforementioned and other objects are obtained in a time-division multiplex switching network having time and spatial circuits in time and space structure, and wherein the spatial through-connection from an incoming time-division multiplex line to an outgoing time-division multiplex line takes place according to the parallel bit method.

According to the invention, this time-division multiplex switching network is characterized by the fact that the spatial switching stages are formed by intermediate storages with storage positions allocated individually to the destination to be selected. The individual PCM signals are written into the latter storage positions with the addresses corresponding to the destination. This information is written into these storages during the time intervals allocated individually to the individual message originating points of the individual time slots forming the particular time channel, and they are read out from these storage positions cyclically, displaced by one time slot.

Between a number of equal-ranking spatial switching stages and a number of successively arranged, equal-ranking spatial switching stages there are inserted demultiplexer/multiplexer means which distribute the PCM signals which are interleaved in time at the outputs of the spatial switching stage outputs in accordance with the destination to be taken, among the inputs of the successively arranged spatial switching stages allocated to the particular destinations.

Due to the inventive construction of the space distribution switching stages, which admits of a route-dependent secondary multiplex formation, spatial switching networks can be constructed, as will be discussed in detail below, which have relatively few crossing conductors and which, therefore, can be produced inexpensively.

In accordance with the invention there can be a further development such that the timing circuits preceding the spatial switching network can take over the task of the first spatial switching stages, resulting in further simplification of the spatial switching network.

BRIEF DESCRIPTION OF THE DRAWINGS

The principles of the invention will be more readily understood by reference to the description of a preferred embodiment in conjunction with drawings.

FIG. 1 is a block diagram of the circuit arrangement of a two-stage time-division multiplex switching unit.

FIG. 2 is a schematic diagram of a time-division multiplex switching network grouped in accordance with FIG. 1, the components of which have the characteristics according to the invention.

FIG. 3 is a time diagram illustrating the processes in the spatial switching stages of the time-division multiplex switching network according to the invention.

DETAILED DESCRIPTION OF THE DRAWINGS

In the time-division multiplex switching network shown in FIG. 1, timing circuits are marked Z. Each such timing circuit Z combines PCM time-division multiplex lines 1-m which are connected to the timing circuits Z over serial to parallel converters S/P. Each group of 8-wire outputs of these timing circuits Z accord with the presupposed parallel bit handling of PCM signals, each PCM word having 8 bits. Each group of outputs leads to a spatial switching stage K of the first stage A of the spatial switching network. A distribution frame V enables a connection from each output of the spatial switching stages K of the first stage A to the inputs of the spatial switching stages K of the second stage B. The outputs of the second stage B may be connected in a manner not shown to the inputs of other switching stages or over parallel to serial converters to outgoing PCM time-division multiplex lines.

FIG. 2 shows in greater detail a time-multiplex switching network having the structural arrangement shown in FIG. 1, but providing more details of the construction of the individual components, wherein like functional units are indicated by like reference letters and numerals.

The fundamental structure and functioning of spatial switching stages K will be discussed. Each of these spatial switching stages K has two intermediate storages Z1 and Z2, each of which has n storage positions for which each store 8 bits. The n storage positions are individually allocated to n destination routes, which are to be reached over the particular spatial switching stage K. The bit number 8 corresponds to the number of the code signal elements used for coding each of the PCM words. A holding storage HK serves as a means to feed the PCM signals supplied by the preceding timing circuit Z to an allocated storage position of the intermediate storages Z1 or Z2 in accordance with the destination route to be taken. The readout from the intermediate storages Z1 and Z2 occurs cyclically as indicated by the circle marked U.

The operation of a spatial switching stage K provided with intermediate storages is as follows.

Due to the parallel bit transmission of the PCM signals through the timing circuit Z, only a fraction of a time slot associated with a particular time channel is required for transmitting the PCM signals to the spatial switching stage K. Hence, each of the time slots associated with the time channels on the multiplexer line SM connected between the output of the timing circuit Z and the spatial switching stage K can be subdivided into a number of time intervals which are assigned to different origin routes, in this case, 1-m origin routes. Therefore, as is assumed in the description of FIG. 3, if a through-connection is to take place from the origin route x to the destination route y and the number of origin routes equals 16, the time channel is divided into 16 time intervals. Holding storage HK of the spatial switching stage K causes the PCM signal supplied in the given time channel to be written into a storage position of one of the two intermediate storages Z1 or Z2 which is allocated to the destination route y. Then, during the cyclic readout of the intermediate storages Z1 and Z2 the particular PCM signal appears at the output of the spatial switching stage K during the time interval y of the subsequent time channel. The time interval y is assigned to the destination route y. Since, as described hereinabove, the write-in and the readout of one and the same PCM signal takes place during different time channels, two intermediate storages are needed for alternate write-in and readout during suceeding time channels.

The intermediate storages Z1 and Z2 are conventional intermediate storages which perform a normal time slot conversion with random write-in and periodic or cyclical readout. The primary difference between the operation of conventional intermediate storages and the intermediate storages Z1 and Z2 is that the storage positions in the intermediate storages Z1 and Z2 are allocated according to the desired routes as described above rather than allocated in the conventional manner according to time channels or time slots. As a result, the address storage HK operates in the same manner as conventional address storages in known TDM switching networks except that, again, the storage positions in the intermediate storages Z1 and Z2 are allocated according to the desired routes as described above whereas, in conventional address storages, storage positions are allocated according to time channels or time slots.

Due to the construction and functioning spatial switching stages K1-Kn as described hereinabove, they each manage with one input E1-En, each of which has 8 wires due to the parallel handling of bits as discussed above. The inputs E1-En are shared by all origin routes and the outputs A1-An are shared by all destination routes. Thus, in this case, the connection of the spatial switching stage outputs A1-An of a first stage A of the switching network with the spatial switching stage inputs E1-En of spatial switching stages K of a second stage B has substantially fewer crosspoints than in conventional switching networks, in which the spatial switching stages have separate inputs for each origin route separate outputs and for each destination route.

The following is a discussion of how such a connection of the outputs and inputs of spatial switching stages K of different stages, e.g., stages A and B, of the switching network can simply be accomplished. A distribution frame V is provided for this purpose, which distributes the PCM signals, graded in time, at the switching stage outputs A1-An of stage A in accordance with their physical allocation among different spatial routes, i.e., among different spatial switching stages K of the following spatial switching stage B. In this distribution frame V, a demultiplexer/multiplexer device is provided. This demultiplex/multiplexer device has a number of lines L1 to Ln which correspond to the number of spatial switching stages K of the first stage A and which are each connected with one of the outputs A1 to An of the spatial switching stages K of the first stage A. The demultiplexer/multiplexer device has, moreover, n switches Sch 1 to Schn, which are used to connect each of the individual lines L1 to Ln with another input E1 to En of the spatial switching stages K of the second stage B. Therefore, each of these switches Sch 1 to Schn is connected on the one hand to one of the inputs E1 to En of the spatial switching stages K of the second stage B and can be connected on the other hand to each of the lines L1 to Ln. The switches Sch 1 to Schn are operated cyclically in a predetermined fixed time sequence.

According to the particular switching positions shown in FIG. 2, which represent a particular instant in time, the switch Sch1 connects the line L1 with the input E1, the switch Sch2 connects the line Ln with the input E2, and the switch Schn connects the line L2 with the input En of the spatial switching stage Kn of the second switching network stage B. For example, the PCM signals associated with the output A1 of the first spatial switching stage K1 of the first stage A, which appear during the first time interval of a given time channel corresponding to a first destination route, reach the first spatial switching stage K1 of stage B. During the same first time interval, the PCM signals provided by the output A2 of the second switching stage K2 of the first stage A reach the $n^{th}$ switching stage Kn of the stage B. Finally, again during the same first time interval, the PCM signals provided by the $n^{th}$ spatial switching stage Kn of the stage A reach the second spatial switching stage K2 of the second stage B. Thus, PCM signals from the spatial switching stages K of the first stage A are transmitted in sequence to the spatial switching stages K of the second stage B. That is, PCM signals from the first spatial switching stage K1 of the first stage A are transmitted in the time interval sequence 1 to n to the spatial switching stages K1 to Kn of the second stage B. PCM signals of the second spatial switching stage K2 of the first stage A are transmitted to the spatial switching stages K1 to Kn of the second stage B in the time interval sequence 2, 3 to n, 1, etc. Finally, the PCM signals of the $n^{th}$ spatial switching stage Kn of the first stage A are transmitted to the spatial switching stages K1 to Kn of the second stage B in the time interval sequence n, 1 to n−1.

As described above, the time channels of the incoming PCM signals are converted to appropriate time channels in the outgoing direction. In this embodiment conventional timing circuits Z are employed for combining 1-m time-division multiplex lines. The PCM signals on each of the TDM lines 1-m are fed to one of the storages S1-Sm of the timing circuit Z. These storages S1-Sm are allocated individually to the time-division multiplex lines 1 to m over serial to parallel converters SP1 to SPm. Each of these storages S1 to Sm has 32 storage positions for 8 bits. In a manner generally known in the art, synchronizing information is transferred on the time-division multiplex lines 1 to m in a time channel held free for such synchronizing purposes. The PCM signals supplied by the time-division multiplex lines 1 to m are entered in sequence into the proper storage positions 1 to 32 of the storages S1-Sm in accordance with the synchronizing information by the switches SchZ1 to SchZm. Thus, for example, storage position 1 of storage S1 stores a PCM word (8 bits) which is transmitted on TDM line 1 in a time slot associated with a particular time channel which is identified by the synchronizing information. Each of the other storage positions 2-32 of storage S1 is sequentially enabled by switch SchZ1 to store a PCM word transmitted on TDM line 1 in time slots associated with successive time channels. Similarly, the other storage S1-Sm in timing circuits Z1-Zn are enabled by switches SchZ1-Zm to store PCM words transmitted on TDM lines 1-m.

A conventional readout circuit L, having an operation period of 125 microseconds, which corresponds to the duration of a time slot cyclically reads out the storages S1 to Sm. The operation period of the readout circuit is such that readout circuit L covers all storages S1 to Sm in an operation period, thereby reading out one storage position from each storage S1 to Sm to one operation period. This storage position is identified by the holding circuit Hz. As a result, a storage position of each storage S1-Sm is read out in each time slot. The particular storage position identified by holding circuit Hz depends each time on the time channel with which the particular time slot is associated. Thus, the number of time intervals in PCM signal transmitted on the eight-wire line SM toward a spatial switching stage K corresponds to the number of time channels on the m time-division multiplex lines.

According to another embodiment of the invention, the readout circuit L does not operate cyclically during the readout from the storages S1-Sm, but directly classifies the read-out PCM signals in time intervals corresponding to the destination route. This means that the timing circuit Z in this case takes over the task of the spatial switching stages K of the first stage A constructed and operated according to the principles of the invention. In this case, in contradistinction to the construction of the time-division multiplex switching network shown in FIG. 2, the demultiplexer/multiplexer device V is directly connected to the outputs of the timing circuits Z.

The embodiment of the invention described hereinabove is intended only to be exemplary of the principles of the invention. It is contemplated that the described embodiment can be changed or modified, while remaining within the scope of the invention, as defined by the appended claims.

I claim:

1. A switching network for interconnecting time-division multiplex (TDM) lines which transmit pulse code modulated (PCM) signals having a plurality of individual PCM words, said switching network having a plurality of time and spatial switching circuits associated with different groups of said TDM lines, wherein the individual PCM words are transmitted in parallel form from incoming TDM lines to outgoing TDM lines through said time and spatial switching circuits, said switching network comprising:

intermediate storage means in each of said spatial switching circuits, said intermediate storage means having a plurality of individual storage positions, each of which is individually assigned to a predetermined destination route in said switching network;

writing means connected to said intermediate storage means for writing individual PCM words into said storage positions pursuant to addresses corresponding to the destination routes to be followed by each PCM word, said writing means writing each PCM word into said storage positions during a time interval individually allocated to the origin route of the PCM word, the time interval forming part of the time slot of the time channel associated with that PCM word;

reading means connected to said intermediate storage means for cyclically reading the PCM words from said storage positions in the next time slot;

said switching network including a plurality of said spatial switching circuits in a first stage and a plurality of said spatial switching circuits in at least a second stage following said first stage and demultiplexer-multiplexer means for connecting the outputs of said spatial switching circuits of said first stage to the inputs of said spatial switching circuits of said second stage to distribute PCM signals, which are interleaved in time at said outputs of said first stage according to destination routes, among said inputs of said second stage corresponding to the destination routes.

2. The switching network defined in claim 1 wherein said intermediate storage means comprises first and second storages which are operated alternately for write-in and read-out of the pulse code modulated signals.

3. The switching network defined in claim 1 wherein said demultiplexer/multiplexer means comprises a number of lines fixedly connected to the outputs of said spatial switching circuits of said first stage.

4. The switching network defined in claim 1 wherein said time circuits precede said spatial switching circuits, said time circuits including storage means, and further comprising readout means inserted between said time circuits and said spatial switching circuits of other stages for reading-out said storage means in said time circuit in such a manner that said pulse code modulation signals are interleaved in time in accordance with the destination route.

* * * * *